United States Patent [19]

Kishida et al.

[11] Patent Number: 5,371,149
[45] Date of Patent: Dec. 6, 1994

[54] LUBRICANT FOR THERMOPLASTIC RESIN WHICH IS A THREE STAGE POLYMER

[75] Inventors: Kazuo Kishida, Ichikawa; Kiyokazu Kitai, Tokyo; Masahiro Kaneda; Kohji Matsumoto, both of Otake, all of Japan

[73] Assignee: Mitsubishi Rayon Company Ltd., Tokyo, Japan

[21] Appl. No.: 194,391

[22] Filed: Feb. 10, 1994

Related U.S. Application Data

[60] Division of Ser. No. 13,986, Feb. 5, 1993, Pat. No. 5,314,965, which is a continuation of Ser. No. 426,187, Oct. 25, 1989, abandoned.

[30] Foreign Application Priority Data

Oct. 31, 1988 [JP] Japan ................................ 63-273203

[51] Int. Cl.$^5$ .................. C08L 33/08; C08L 33/10; C08L 33/12
[52] U.S. Cl. ........................ 525/309; 252/56 R; 252/52 R; 252/12; 525/302; 525/437; 525/241; 525/221
[58] Field of Search ............... 525/309, 302, 437, 227, 525/240, 241, 221; 252/12, 56 R, 52 R

[56] References Cited

U.S. PATENT DOCUMENTS

| | | | |
|---|---|---|---|
| 3,925,510 | 12/1975 | Ide et al. | 525/309 |
| 4,052,482 | 10/1977 | Ide et al. | 525/309 |
| 4,128,605 | 12/1978 | Kishida et al. | 525/309 |
| 4,508,875 | 4/1985 | Kishida et al. | 525/309 |
| 4,730,024 | 3/1988 | Kishida et al. | 525/309 |
| 5,314,965 | 5/1994 | Kishida et al. | 525/309 |

*Primary Examiner*—Prince Willis, Jr.
*Assistant Examiner*—James M. Silbermann
*Attorney, Agent, or Firm*—Oblon, Spivak, McClelland, Maier & Neustadt

[57] ABSTRACT

A lubricant for a thermoplastic resin, which is a three-stage polymer obtained by (A) polymerizing 80–100 w.t.% of methyl methacrylate and 0–20 w.t.% of other copolymerizable monomer so that the reduced viscosity $\eta sp/C$ of the obtained polymer is not higher than 2 dl/g, (B) polymerizing 30–70 weight parts of a monomer mixture composed of 20–80 w.t.% of an acrylic acid ester and 80–20 w.t.% of styrene or a substituted styrene in the presence of 10–60 weight parts of the polymer obtained at stage (A), so that the reduced viscosity $\eta sp/C$ of the copolymer obtained by polymerizing 5 to 30 weight parts of a monomer or monomer mixture composed of 50–100 w.t.% of a methacrylic acid ester and 0–50 w.t.% of other copolymerizable monomer in the presence of the two-stage polymer formed through stages (A) and (B), is that the total amount of the components used at staged (A), (B) and (C) is 100 weight parts and the reduced viscosity $\eta sp/C$ of the polymer obtained by polymerizing the monomer or monomer mixture in the absence of the two-stage polymer formed through stages (A) and (B) is not higher than 1.5 dl/g.

8 Claims, No Drawings

LUBRICANT FOR THERMOPLASTIC RESIN WHICH IS A THREE STAGE POLYMER

This application is a divisional of copending application Ser. No. 08/013,986, filed Feb. 5, 1993 now U.S. Pat. No. 5,314,965 which is a continuation of U.S. Pat. No. 07/426,187 filed Oct. 25, 1989 now abandoned.

BACKGROUND OF THE INVENTION (1) Field of the Invention

The present invention relates to a lubricant for a thermoplastic resin and a thermoplastic resin composition comprising this lubricant. More particularly, the present invention relates to a lubricant having excellent properties such that, when the lubricant is incorporated in a thermoplastic resin such as a vinyl chloride resin, a polycarbonate resin, a polyester resin, an ABS resin, a styrene resin, a methacrylic resin or a polyethylene resin, a thermoplastic resin composition showing excellent flowability and release property at the molding step and providing a molded article having a good gloss and transparency is obtained without an adverse affect on the characteristics inherently possessed by the thermoplastic resin.

(2) Description of the Related Art

Thermoplastic resins, especially vinyl chloride resins, have excellent physical and chemical properties and thus are widely used.

Nevertheless, vinyl chloride resins have a problem in that the processability in a broad sense is poor, and although plasticizer, a processing aid composed mainly of methyl methacrylate, a lubricant or the like has been used for solving this problem, a general solution cannot be obtained by this method.

As means for solving this problem, improved vinyl chloride resin compositions have been proposed in U.S. Pat. No. 3,925,510.

In the proposed vinyl chloride resin compositions, maintenance of the transparency possessed by the vinyl chloride resin and improvement of the processability such as the drawdown effect, the flowability at the molding step, the elongation at a high temperature, the release property from the roll surface at the calendering step, and the long-period durability of lubricating properties are intended, and certain effects are attained.

Nevertheless, in view of the improvement of the productivity and quality, and to obtain an energy-saving effect, it is desirable to develop a vinyl chloride resin having a high durability of lubricating properties at the processing step and capable of providing a molded article having a good gloss and transparency, and the proposed compositions were still unsatisfactory. Moreover, an increase of substances adhering to the mold and the like (plate-out) occurs under certain molding conditions, and the proposed compositions cannot completely satisfy the market requirements.

SUMMARY OF THE INVENTION

An object of the present invention is to solve the above-mentioned problem, that is, to provide a lubricant for a thermoplastic resin, which shows an excellent flowability and release property at the molding step and provides molded article having a good gloss and transparency, and a thermoplastic resin composition comprising this lubricant.

More specifically, in accordance with the present invention, there is provided a lubricant for a thermoplastic resin, which is a three-stage polymer obtained by the following sequential these-stage polymerization process. In the first stage, 80 to 100% by weight of methyl methacrylate and 0 to 20% by weight of other monomer copolymerizable therewith are polymerized so that the reduced viscosity $\eta sp/C$ (as determined at 25° C. with respect to a solution of 0.1 g of the polymer in 100 ml of chloroform) of the obtained polymer is not higher than 2 dl/g.

In the second stage, 30 to 70 parts by weight of a monomer mixture comprising 20 to 80% by weight of an acrylic acid ester and 80 to 20% by weight of styrene or a substituted styrene is polymerized in the presence of 10 to 60 parts by weight of the polymer obtained at the first stage, so that the reduced viscosity $\eta sp/C$ of the copolymer obtained by polymerizing the monomer mixture in the absence of the polymer obtained at the first stage is not higher is than 1 dl/g.

In the third stage, 5 to 30 parts by weight of a monomer or monomer mixture comprising 50 to 100% by weight of a methacrylic acid ester and 0 to 50% by weight of other monomer copolymerizable therewith is polymerized in the presence of the two-stage polymer formed through the first and second stages, so that the total amount of the components used at the three-stages is 100 parts by weight and the reduced viscosity $\eta sp/C$ of the polymer obtained by polymerizing the monomer or monomer mixture in the absence of the two-stage polymer formed through the first and second stages is not higher than 1.5 dl/g.

Furthermore, according to the present invention, there is provided a thermoplastic resin composition comprising 100 parts by weight of a thermoplastic resin and 0.05 to 10 parts by weight of the above-mentioned lubricant.

DESCRIPTION OF THE PREFERRED EMBODIMENTS

The thermoplastic resin in which the lubricant of the present invention is incorporated includes a vinyl chloride resin, a polycarbonate resin, a polyolefin resin, a polyester resin, a vinyl fluoride resin, an ABS resin, a styrene resin, and a methacrylic resin. As the vinyl chloride resin, there can be used a homopolymer of vinyl chloride and a copolymer comprising at least 80% by weight of vinyl chloride units. As the monomer to be copolymerized with vinyl chloride, there can be mentioned, for example, vinyl acetate, ethylene, propylene, styrene, vinyl bromide, vinylidene chloride, acrylic acid esters, and methacrylic acid esters.

The lubricant for a thermoplastic resin according to the present invention is a three-stage polymer obtained by a sequential three-stage polymerization process. This polymer has a sandwich structure in which a methyl methacrylate copolymer and a methacrylic acid ester polymer are arranged on the inner side and outer side, respectively, of a component imparting lubricating properties, to improve the kneadability and compatibility with a thermoplastic resin such as a vinyl chloride resin.

Component (A) i.e., the first stage polymer is a homopolymer of methyl methacrylate or a copolymer comprising at least 80% by weight of methyl methacrylate and up to 20% by weight of other monomer copolymerizable therewith. The monomer to be copolymerized with methyl methacrylate is not particularly limited, and an appropriate monomer is selected according to the intended object. For example, there can be mentioned monoethylenically unsaturated monomers such as unsaturated nitriles, vinyl esters, acrylic acid esters, and methacrylic acid esters other than methyl methacrylate. These monomers can be used alone or in the form of mixture of two or more thereof. If the amount of the comonomer exceeds 20% by weight, the synergistic effect by the methyl methacrylate polymer as component (A) and the low-molecular weight polymer as component (B) (i.e., the second stage polymer), for example, the durability of lubricating properties, is drastically reduced.

To obtain the intended lubricant, a chain transfer agent such as n-octyl mercaptan must be used in addition to the above-mentioned monomer and polymerization must be carried out so that the reduced viscosity $\eta sp/C$ is not higher than 2 dl/g. The reduced viscosity $\eta sp/C$ referred to herein is the value measured at 25° C. with respect to a solution of 0.1 g of the polymer in 100 ml of chloroform (the same will apply hereinafter). If the reduced viscosity $\eta sp/C$ of component (A) exceeds 2 dl/g, the processability-improving effect is too high and the lubricating effect is reduced.

The amount of component (A) incorporated is 10 to 60 parts by weight, preferably 10 to 50 parts by weight, per 100 parts by weight of the total amount of components (A), (B) and (C), i.e., the total amount of component (A) exceeds 60 parts by weight, the lubricating effect is reduced, and if the amount of component (A) is smaller than 10 parts by weight, the processability is poor and the durability of the lubricating properties is reduced.

Component (B), i.e., the second stage polymer, is a copolymer derived from a monomer mixture comprising 20 to 80% by weight of a monomer selected from acrylic acid esters and 80 to 20% by weight of styrene or a substituted styrene. As the acrylic acid ester, there can be mentioned, for example, ethyl acrylate, butyl acrylate, benzyl acrylate, 2-ethylhexyl acrylate, cyclohexyl acrylate and phenyl acrylate. If styrene is used for component (B), a composition having an excellent transparency is obtained, but a substituted styrene such as α-ethyl styrene can be used according to need.

If the amount of the acrylic acid ester is smaller than 20% by weight, the transparency is poor, and if the amount of the acrylic acid ester exceeds 80% by weight, the lubricating effect is reduced.

To impart an especially good lubricating effect to the composition of the present invention, use of monomer or monomer mixture giving a polymer having a low glass transition temperature as the acrylics acid ester for component (B) is preferred. To obtain an excellent lubricating effect, a chain transfer agent such as n-octyl-mercaptane must be used to reduce the molecular weight, and the polymerization must be carried out so that the reduced viscosity $\eta sp/C$ of the copolymer obtained by polymerizing alone the monomers for component (B) is not higher than 1 dl/g. Practically, the polymerization is carried out by appropriately adjusting the amounts of the used chain transfer agent and catalyst and the polymerization temperature.

The amount of component (B) incorporated is 30 to 70 parts by weight, preferably 35 to 70 parts by weight, per 100 parts by weight of the total amount of components (A), (B) and (C). If the amount of component (B) is smaller than 30 parts by weight, the lubricating properties of the composition are reduced, and if the amount of component (B) is larger than 70 parts by weight, the surface characteristics, transparency and gloss are poor.

Component (C), i.e., the third stage polymer, is obtained by polymerizing a monomer or monomer mixture comprising 50 to 100% by weight of a methacrylic acid ester and 0 to 50% by weight of other monomer copolymerizable therewith. As the methacrylic acid ester, there can be mentioned methyl methacrylate, ethyl methacrylate, butyl methacrylate, benzyl methacrylate, 2-ethylhexyl methacrylate, cyclohexyl methacrylate, and phenyl methacrylate, and methyl methacrylate is especially preferable form the viewpoint of the compatibility with a vinyl chloride resin. The monomer to be copolymerized with the methacrylic acid ester includes ethylenically unsaturated monomers such as unsaturated nitriles, vinyl esters, and acrylic acid esters. The amount of component (C) is 5 to 30 parts by weight, preferably 5 to 25 parts by weight, per 100 parts by weight of the total amount of components (A), (B) and (C). If the amount of component (C) is smaller than 5 parts by weight, secondary agglomeration of the polymer is often caused at post treatments such as dehydration and drying, resulting in a reduction of the productivity. If the amount of component (C) is larger than 30 parts by weight, the durability of lubricating properties is reduced.

The reduced viscosity $\eta sp/C$ of component (C) can be optionally adjusted by customary procedures by controlling the chain transfer agent, the polymerization temperature and the like. To obtain the intended lubricant, the polymerization must be carried out so that the reduced viscosity $\eta sp/C$ of component (C) is not higher than 1.5 dl/g, preferably lower than 1.0 dl/g.

The lubricant for a thermoplastic resin comprising the above-mentioned components (A), (B) and (C) is a three-stage polymer, and to obtain a required lubricating effect, the molecular weight of the three-stage polymer must be reduced. If high-molecular-weight fractions are present in components (A) and (C), processing aid effects are manifested. For example, at the extrusion molding step, the viscosity of the resin is increased during the molding, thermal discoloration is conspicuous, and the lubricating effect is drastically reduced. Therefore, the presence of such high-molecular-weight fractions is not preferred. The reduced viscosity $\eta sp/C$ of the three-stage polymer is not higher than 1.5 dl/g and preferably not higher than 1.0 dl/g.

The three-stage structure of the lubricant for a thermoplastic resin according to the present invention can be easily obtained by polymerizing components (A), (B), and (C) in sequence. As the polymerization process, there can be adopted, for example, emulsion polymerization, suspension polymerization and bulk polymerization, emulsion polymerization being preferable. In the process of preparing the three-stage polymer by emulsion polymerization, to form the intended three-layer structure, preferably fresh emulsifier is not added during the polymerization at the second and subsequent stages, to substantially control formation of homopolymers of components (B) and (C). Any known emulsifiers can be used. For example, ordinary anionic, cationic and nonionic surface active agents can be used. If the pH value of the polymerization mixture is shifted to the alkaline side according to the kind of emulsifier used, an appropriate pH-adjusting agent can be used for preventing the hydrolysis of the acrylic acid ester. As the pH-adjusting agent, there can be used, for example, boric acid/potassium chloride/sodium hydroxide, potassium dihydrogenphosphate/disodium hydrogenphosphate, boric acid/potassium chloride/sodium carbonate, boric acid/sodium carbonate, potassium hydrogencitrate/citiric acid, potassium dihydrogenhosphate/borax, and disodium hydrogenphosphate/citric acid. Water-soluble or oil-soluble, single or redox polymerization initiators can be used. For example, water-soluble inorganic initiators such as usual persulfates can be used above or in combination with sulfites, hydrogensulfites or thiosulfates as redox initiators. Moreover, redox initiators such as organic peroxide/sodium formaldehyde-sulfoxylate, and azo compounds can be used.

In the process for the preparation of the three-stage polymer, to impart an excellent transparency and good durability of lubricating properties to the composition of the present invention, and the molded article prepared therefrom, the molecular weight of second stage polymer as component (B) must be maintained at a very low level. Namely, the reduced viscosity $\eta sp/C$ of the polymer obtained by singly polymerizing the monomer for component (B) must be not higher than 1 dl/g, preferably 0.1 to 0.8 dl/g. If the reduced viscosity is higher than 1, the lubricating effect is reduced and good results can not be obtained. The reduced viscosity $\eta sp/C$ of the third stage polymer as component (C) can be optionally adjusted by controlling the chain transfer agent and the polymerization temperature by customary procedures. To obtain the intended lubricant, the polymerization must be carried out so that the reduced viscosity $\eta sp/C$ of component (C) is not higher than 1.5 dl/g, preferably not higher than 1.0 dl/g.

In the thermoplastic resin composition of the present invention, the lubricant is incorporate in an amount of 0.05 to 10 parts by weight into 100 parts by weight of the thermoplastic resin. If the amount of the lubricant is smaller than 0.05 part by weight a lubricating effect cannot be obtained and the flowability and release property are reduced. If the amount of the lubricant is larger than 10 parts by weight the flowability and release property are higher than desirable and therefore, a kneading effect is not obtained and surface defects easily appear on the obtained molded article.

The thermoplastic resin composition of the present invention can be prepared by mixing the thermoplastic resin with the lubricant by customary procedures.

Stabilizers such as organic tin compounds, metal soaps such as tin type, barium type and zinc type metal soaps, and epoxy compounds: lubricants such as stearic acid, ester waxes, paraffin wax and stearyl alcohol; plasticizers such as phthalic acid esters, phosphoric acid esters, fatty acid esters and epoxy type plasticizers: impact resistance improvers such as MBS and ABS; colorants such as carbon black and titanium oxide; fillers such as calcium carbonate and asbestos; inorganic foaming agents such as ammonium carbonate and sodium bicarbonate; and organic foaming agents such as nitro type foaming agents, sulfohydrazide type foaming agents and azo foaming agents, sulfohydraxide type foaming agents and azo type foaming agent can be incorporated into the thermoplastic resin composition of the present invention according to need.

The present invention will now be described in detail with reference to the following examples and comparative examples. Note, all of "parts" in the examples are by weight.

The reduced viscosities $\eta sp/C$ of the polymers of the respective layers of the three-stage polymer of the present invention are the values of the polymers obtained by polymerizing alone the monomers for components (A), (B), and (C), respectively, i.e., in the absence of the preceding-stage polymer. The reduced viscosity $\eta sp/C$ of each polymer was determined by the following method.

The monomers for each component were polymerized alone by using a predetermined emulsifier and polymerization initiator at a predetermined polymerization temperature while changing the amount of a chain transfer agent, and a calibration curve of the reduced viscosity $\eta sp/C$ was prepared and the reduced viscosity $\eta sp/C$ of each component was read from the calibration curve.

PREPARATION OF LUBRICANTS FOR THERMOPLASTIC RESINS

Example 1

A reaction vessel equipped with a stirrer and a reflux cooler was charged with 280 parts of deionized water, 1.5 parts of sodium dioctylsulfosuccinate, 2 parts of ammonium persulfate, 0.1 part of n-octylmercaptan, and 30 parts of methyl methacrylate as the monomer for component (A), and the inner atmosphere of the reaction vessel was replaced by nitrogen. The temperature in the reaction vessel was elevated to 65° C. with stirring, and the mixture was stirred at this temperature for 2 hours. Then a mixture comprising 36 parts of styrene, 24 parts of ethyl acrylate and 0.5 part of n-octylmercaptane of component (B) was added dropwise to the reaction mixture over a period of 1 hour, and after the dropwise addition, a mixture comprising 10 parts of methyl methacrylate and 0.05 part of n-octylmercaptan for component (C) was added to the reaction mixture over a period of 30 minutes. The mixture was stirred for 2 hours to complete polymerization, and the obtained emulsion was cooled, salted out by aluminum chloride, filtered, washed, and dried to obtain a polymer.

Examples 2 through 8

In the same reaction vessel as used in Example 1, polymers were obtained under the same polymerization conditions as adopted in Example 1, using the starting materials shown in Table 1.

Comparative Example 1 through 11

In Comparative Example, the lubricant of the present invention was not added to a vinyl chloride resin but a stabilizer was added. In Comparative Examples 2 through 11, polymers were prepared in the same manner as described in Example 1 except that the conditions were outside the scope of the present invention, as shown in Table 1.

As apparent from Table 1, in Comparative Examples 2, 3 and 6, agglomeration (blocking) of the polymers occurred at post treatments such as coagulation, dehydration and drying, and the productivity was low.

Preparation and Evaluation of Vinyl Chloride Resin Composition

Vinyl chloride resin compositions of the present invention (Examples) and the Comparative Examples were prepared by mixing 100 parts of a vinyl chloride resin having an average polymerization degree of 700, 1.5 parts of dibutyl-tin mercaptide, 1 part of an epoxy type aid, 0.5 part of dibutyl-tin maleate, and 3 parts of the polymer sample obtained above by a Henschel mixer. The vinyl chloride resin compositions were evaluated by the evaluation methods described below. The results are shown in Table 1.

(1) Stickiness

By using 6-inch rolls, 100 g of the sample was kneaded at roll temperature of 205° C. and 200° C. with a roll spacing of 1 mm, and the time required for bringing about the state wherein the sheet adhered to the roll surface and was not peeled therefrom was measured. The longer this time, the better the durability of the lubricating effect at a high temperature.

(2) Gelling characteristics (lubricating properties and adherence) by Brabender Plasti-Corder Tmax:

The time (minutes) required for arriving at a maximum torque (kg.m) at the measurement using Brabender Plasti-Corder was determined. The smaller the Tmax value, the more quickly melted the resin and the poorer the lubricating properties.

Mmax:

The maximum torque (kg.m) was determined at the above measurement. The larger the Mmax value, the higher the melt viscosity of the resin and the poorer the lubricating properties.

Adherence:

Kneading was carried out for 15 minutes at a temperature of 180° C. and a rotation number of 30 rpm with a packed amount of 50 g, and the adherence of the resin to the vessel wall was examined and evaluated according to the standard of from 1 to 10. A smaller value indicates better lubricating properties.

(3) Flowability

By using a single-screw extruder having a screw diameter of 25 mm, the amount of the sample extruded for 3 minutes was measured (extruder temperatures: $C_1=160°$ C., $C_2=170°$ C., $C_3=180°$ C. die$=180°$ C.; rotation number$=40$ rpm). The larger the extruded amount, the better the flowability.

(4) Transparency

By using 6-inch rollers, 100 g of the sample was kneaded at roll temperatures of 185° C. and 180° C. for 5 minutes with a roll spacing of 1 mm, and the kneaded sample was compressed (40 kg) at 185° C. to form a test piece having thickness of 2 mm. By using an integration sphere type haze meter, the haze value and total luminous transmittance were measured according to the method of JIS K-6714.

Examples 9 through 14 and Comparative Examples 12 through 17

By using a Henschel mixer, 100 parts of a thermoplastic resin shown below, in which 3 parts of the polymer obtained in Example 1 was incorporated or was not incorporated, was mixed and was then extruded by using a single-screw extruder having a screw diameter of 25 mm. The extrusion temperatures were changed according to the kinds of the thermoplastic resins used, as shown below. With respect to each resin, the extruded amount was measured to determine the flowability, and the extrusion pressure was measured at the time of extrusion. The results are shown in Table 2.

(1) ABS resin (Diapet® ABS#3001 supplied by Mitsubishi Rayon) (molding temperatures: $C_1=180°$ C., $C_2=200°$ C., $C_3=200°$ C., head$=200°$ C die$=200°$ C.)

(2) Styrene resin (Styrol NF-20 supplied by Idemitsu Petrochemical) (molding temperatures: $C_1=160°$ C., $C_2=180°$ C., $C_3=200°$ C., head$=200°$ C., die$=210°$ C.)

(3) Polycarbonate resin (Novalex 7022 supplied by Mitsubishi Chem. Ind.) (molding temperatures: $C_1=230°$ C., $C_2=260°$ C., $C_3=270°$ C., head$=270°$ C., die$=80°$ C.)

(4) Polyethylene resin (Hizex 7000F supplied by Mitsui Petrochemical) (molding temperatures: $C_1=150°$ C., $C_2=165°$ C., $C_3=175°$ C., head$=175°$ C., die$=75°$ C.)

(5) Polyester resin (Dianite® A-200 supplied by Mitsubishi Rayon) (molding temperatures: $C_1=280°$ C., $C_2=280°$ C., $C_3=280°$ C., head$=260°$ C., die$=260°$ C.)

(6) Vinyl chloride resin (Ryonichi PVC supplied by Ryonichi KK: polymerization degree$=700$) (molding temperature: $C_1=160°$ C., $C_2=170°$ C., $C_3=180°$ C. head$=175°$ C., die$=180°$ C.)

As apparent from the results shown in Table 2, if the polymer obtained in Example 1 was incorporated in a thermoplastic resin, the extrusion pressure was reduced and the extruded amount was increased, regardless of the kind of thermoplastic resin, and an excellent lubricating effect was attained.

TABLE 1

| Sample | Composition of three-stage polymer | | | | | | Three-stage polymer $\eta sp/C$ (dl/g) | Stickiness (min) | Gelling characteristics | | | Flowability Extruded amount (g/3 min) | Transparency | |
|---|---|---|---|---|---|---|---|---|---|---|---|---|---|---|
| | First stage A | | Second stage B | | Third stage C | | | | | | | | | |
| | MMA (parts) n-OSH (parts) | $\eta sp/C$ (dl/g) | St/EA (parts) n-OSH (parts) | $\eta sp/C$ (dl/g) | MMA (parts) n-OSH (parts) | $\eta sp/C$ (dl/g) | | | Tmax (min) | Mmax (kg·m) | Adherence | | Total luminous transmittance (%) | Haze value (%) |
| Example 1 | 30 0.1 | 1.0 | 36/24 0.5 | 0.6 | 10 0.05 | 1.0 | 0.7 | 43 | 5.0 | 4.2 | 1.0 | 150 | 85.7 | 5.8 |
| Example 2 | 30 0.1 | 1.0 | (St/BA) 36/24 0.5 | 0.5 | 10 0.05 | 1.0 | 0.6 | 50 | 5.2 | 4.0 | 1.0 | 155 | 85.0 | 6.2 |
| Example 3 | 15 0.1 | 1.0 | 36/24 0.5 | 0.6 | 25 0.05 | 1.0 | 0.7 | 40 | 4.5 | 4.3 | 1.2 | 145 | 85.9 | 5.7 |
| Example 4 | 30 0.1 | 1.0 | 30/20 0.5 | 0.6 | 20 0.05 | 1.0 | 0.8 | 38 | 4.2 | 4.5 | 1.6 | 143 | 85.5 | 6.0 |
| Example 5 | 30 0.08 | 1.4 | 30/20 0.5 | 0.6 | 20 0.03 | 1.5 | 1.3 | 35 | 4.0 | 4.8 | 2.5 | 140 | 85.6 | 5.9 |
| Example 6 | 30 0.1 | 1.0 | 30/20 0.4 | 0.9 | 20 0.05 | 1.0 | 0.9 | 30 | 3.7 | 5.0 | 3.0 | 137 | 85.7 | 6.0 |
| Example 7 | 20 0.1 | 1.0 | 42/18 0.5 | 0.7 | 20 0.05 | 1.0 | 0.8 | 30 | 3.8 | 5.0 | 2.8 | 138 | 86.2 | 5.6 |
| Example 8 | 20 0.1 | 1.0 | 18/42 0.5 | 0.5 | 20 0.05 | 1.0 | 0.6 | 48 | 5.2 | 4.0 | 1.0 | 155 | 84.0 | 6.8 |
| Comparative Example 1 | — | — | — | — | — | — | — | 3.0 | 2.0 | 5.0 | 10.0 | 120 | 86.0 | 5.7 |
| Comparative | — | — | 50/50 | 0.6 | — | — | 0.6 | — | — | — | — | — | — | — |

TABLE 1-continued

| | Composition of three-stage polymer | | | | | | | | | | Flowability | Transparency | |
|---|---|---|---|---|---|---|---|---|---|---|---|---|---|
| | First stage A | | Second stage B | | Third stage C | | Three-stage poly- | | Gelling characteristics | | Ex-truded | Total luminous | |
| | MMA | | St/EA | | MMA | | mer | Stick- | | Mmax | Ad- | amount | trans- | Haze |
| | (parts) n-OSH | ηsp/C | (parts) n-OSH | ηsp/C | (parts) n-OSH | ηsp/C | ηsp/C | ness | Tmax | (kg · | her- | (g/3 | mittance | value |
| Sample | (parts) | (dl/g) | (parts) | (dl/g) | (parts) | (dl/g) | (dl/g) | (min) | (min) | m) | ence | min) | (%) | (%) |
| Example 2*1 | | | 0.5 | | | | | | | | | | | |
| Comparative Example 3*2 | 40 0.007 | 3.0 | 30/30 0.5 | 0.6 | — | — | 1.8 | 40 | 4.2 | 4.5 | 3.0 | 120 | 85.0 | 5.7 |
| Comparative Example 4 | — | — | 30/30 0.5 | 0.6 | 40 0.03 | 3.0 | 1.8 | 15 | 3.0 | 5.5 | 5.0 | 125 | 86.0 | 6.2 |
| Comparative Example 5 | 40 0.1 | 1.0 | 12/8 0.5 | 0.6 | 40 0.05 | 1.0 | 0.8 | 7.0 | 3.2 | 5.6 | 7.0 | 124 | 86.2 | 6.0 |
| Comparative Example 6*1 | 16 0.1 | 1.0 | 48/32 0.5 | 0.6 | 4 0.05 | 1.0 | 0.7 | 35 | *4.8 | 4.0 | 1.2 | 138 | 85.4 | 6.3 |
| Comparative Example 7 | 35 0.05 | 2.2 | 30/20 0.5 | 0.6 | 15 0.05 | 1.0 | 1.8 | 20 | 2.5 | 5.2 | 5.0 | 125 | 85.8 | 5.9 |
| Comparative Example 8 | 35 0.1 | 1.0 | 30/20 0.5 | 2.8 | 15 0.015 | 2.5 | 1.6 | 18 | 2.4 | 5.2 | 5.0 | 124 | 85.7 | 6.0 |
| Comparative Example 9 | 35 0.1 | 1.0 | 30/20 0.03 | 2.8 | 15 0.05 | 1.0 | 2.0 | 12 | 1.8 | 5.4 | 8.0 | 120 | 86.0 | 5.8 |
| Comparative Example 10 | 30 0.1 | 1.0 | 45/5 0.5 | 0.7 | 20 0.05 | 1.0 | 0.9 | 7.0 | 3.2 | 5.5 | 8.0 | 121 | 86.2 | 5.6 |
| Comparative Example 11 | 30 0.1 | 1.0 | 5/45 0.5 | 0.5 | 20 0.05 | 1.0 | 0.7 | 40 | 5.0 | 4.2 | 1.2 | 148 | 80.0 | 13.0 |

*1The polymer was blocked during coagulation and could not be powdered.
*2The polymer was blocked during coagulation and was difficult to powder.
MMA: methyl methacrylate
BA: butyl acrylate
EA: ethyl acrylate
St: styrene
n-OSH: n-octyl mercaptan

TABLE 2

| | Kind of thermoplastic resin | Addition of polymer of Example 1 | Pressure at extrusion (kg/m) | Extruded amount (g/10 min) |
|---|---|---|---|---|
| Example 9 | ABS resin | Added | 32 | 370 |
| Comparative Example 12 | | Not added | 40 | 300 |
| Example 10 | Styrene resin | Added | 40 | 380 |
| Comparative Example 13 | | Not added | 45 | 340 |
| Example 11 | Polycarbonate resin | Added | 35 | 320 |
| Comparative Example 14 | | Not added | 42 | 240 |
| Example 12 | Polyethylene resin | Added | 30 | 390 |
| Comparative Example 15 | | Not added | 35 | 350 |
| Example 13 | Polyester resin | Added | 36 | 360 |
| Comparative Example 14 | | Not added | 42 | 290 |
| Example 14 | Vinyl chloride resin | Added | 35 | 350 |
| Comparative Example 15 | | Not added | 40 | 320 |

We claim:

1. A lubricant for a thermoplastic resin, which comprises a three-stage polymer obtained by (A) polymerizing 80 to 100% by weight of methyl methacrylate and 0 to 20% by weight of other monomer copolymerizable therewith so that the reduced viscosity ηsp/C (as determined at 25° C. with respect to a solution of 0.1 g of the polymer in 100 ml of chloroform) of the obtained polymer is not higher than 1.4 dl/g, (B) polymerizing 30 to 70 parts by weight of a monomer mixture comprising 20 to 80% by weight of an acrylic acid ester and 80 to 20% by weight of styrene or a substituted styrene in the presence of 10 to 60 parts by weight of the polymer obtained at stage (A), so that the reduced viscosity ηsp/C of the copolymer obtained by polymerizing the monomer mixture in the absence of the polymer obtained at stage (A) is not higher than 1 dl/g, and (C) polymerizing 5 to 30 parts by weight of a monomer or monomer mixture comprising 50 to 100% by weight of a methacrylic acid ester and 0 to 50% by weight of other monomer copolymerizable therewith in the presence of the two-stage polymer formed through stages (A) and (B), so that the total amount of the components used at the stages (A), (B) and (C) is 100 parts by weight and the reduced viscosity ηsp/C of the polymer obtained by polymerizing the monomer or monomer mixture in the absence of the two-stage polymer formed through stages (A) and (B) is not higher than 1.5 dl/g.

2. The lubricant according to claim 1, wherein the monomer copolymerized with methyl methacrylate in stage (A) is an ethylenically unsaturated monomer selected from the group consisting of unsaturated nitriles, vinyl esters, acrylic acid esters, and methacrylic acid esters other than methyl methacrylate.

3. The lubricant according to claim 1, wherein the amount of the polymer prepared in stage (A) and used in stage (B) is 10 to 50 parts by weight per 100 parts by weight of the total amount of the polymers prepared in stages (A), (B) and (C).

4. The lubricant according to claim 1, wherein the acrylic acid ester is selected from the group consisting of ethyl acrylate, butyl acrylate, benzyl acrylate, 2-ethylhexyl acrylate, cyclohexyl acrylate and phenyl acrylate, and the substituted styrene is α-methyl styrene.

5. The lubricant according to claim 1, wherein the amount of the monomer mixture used in stage (B) is 35 to 70 parts by weight per 100 parts by weight of the total amount of the polymers prepared in stages (A), (B) and (C).

6. The lubricant according to claim 1, wherein the methacrylic acid ester used in stage (C) is selected from the group consisting of methyl methacrylate, ethyl methacrylate, butyl methacrylate, benzyl methacrylate, 2-ethylhexyl methacrylate, cyclohexyl methacrylate, and phenyl methacrylate, and the monomer copolymerized with the methacrylic acid ester in stage (C) is an ethylenically unsaturated monomer selected from the group consisting of unsaturated nitriles, vinyl esters and acrylic acid esters.

7. The lubricant according to claim 1, wherein the amount of the monomer or monomer mixture used in stage (C) is 5 to 25 parts by weight per 100 parts by weight of the total amount of the polymers prepared in stages (A), (B) and (C).

8. The lubricant according to claim 1, wherein the three-stage polymer has a reduced viscosity $\eta sp/C$ of not higher than 1.5 dl/g.

* * * * *